United States Patent
Ikegaya et al.

(10) Patent No.: US 6,510,456 B1
(45) Date of Patent: Jan. 21, 2003

(54) DATA TRANSFER CONTROL METHOD AND SYSTEM, DATA TRANSFER CONTROL PROGRAM FILE, AND FILE STORAGE MEDIUM

(75) Inventors: Naoko Ikegaya, Sagamihara (JP); Taketoshi Sakuraba, Sagamihara (JP); Teruo Tanaka, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/273,983

(22) Filed: Mar. 22, 1999

(30) Foreign Application Priority Data

Mar. 25, 1998 (JP) .......................................... 10-096629

(51) Int. Cl.⁷ ............................................. G06F 15/16
(52) U.S. Cl. ........................ 709/213; 707/10; 709/201
(58) Field of Search ................................ 709/200, 201, 709/213, 214, 215, 216; 707/10; 711/147, 148, 161, 162

(56) References Cited

U.S. PATENT DOCUMENTS

| | | | |
|---|---|---|---|
| 5,388,266 A | 2/1995 | Frey et al. .................. | 711/163 |
| 5,561,809 A | 10/1996 | Elko et al. .................. | 709/213 |
| 5,987,506 A | * 11/1999 | Carter et al. ................. | 709/213 |

\* cited by examiner

*Primary Examiner*—Dung C. Dinh
(74) *Attorney, Agent, or Firm*—Antonelli, Terry, Stout & Kraus, LLP

(57) ABSTRACT

A computer connected to a plurality of computers, having: a storage area for storing data representative of properties of the plurality of computers relative to the computer; a data area for storing data to be used by the plurality of computers; and a program for determining a computer which holds data in the data area in accordance with a request for the data area. The computer can recover data lost from the computer from a proper area. Each of the properties of the plurality of computers is represented by a value determined by at least one of a computer fault occurrence frequency, a data transfer speed relative to the computer, an importance degree of data shared by processing programs of the plurality of computers. In accordance with the value in the storage area, the data in the data area,can be stored in multiples or in divisions.

25 Claims, 10 Drawing Sheets

| COMPUTER CONNECTION NUMBER | CONNECTION TYPE | INTERFACE OF EXTERNAL STORAGE DEVICE | FAULT OCCURRENCE FREQUENCY |
|---|---|---|---|
| 1 | HIGH SPEED OPTICAL CHANNEL | OPTICAL CHANNEL | 10 |
| 2 | METAL CHANNEL | SCSI CHANNEL | 5 |
| ⋮ | ⋮ | ⋮ | ⋮ |

| SHARED DATA IDENTIFICATION INFORMATION | IMPORTANCE DEGREE | MULTIPLE NUMBER | DIVISION NUMBER | TRNSFER DESTINATION COMPUTER | DATA PRESENCE |
|---|---|---|---|---|---|
| DATA 1 | 2 | 2 | | 5<br>6 | 1 |
| DATA 2 | 1 | 1 | 2 | 4<br>5<br>6 | 1 |
| ------ | ------ | ------ | ------ | ------ | ------ |
| 701 | 702 | 703 | 704 | 705 | 706 |

700

DATA TRANSFER CONTROL METHOD AND SYSTEM, DATA TRANSFER CONTROL PROGRAM FILE, AND FILE STORAGE MEDIUM

BACKGROUND OF THE INVENTION

1. Field of the Invention

The present invention relates to data transfer between computers, and more particularly to a shared data transfer method in which a computer for performing a shared data saving process is selected in accordance with the properties of a plurality of computers using a shared storage area, and to a coupling facility for transferring shared data.

2. Description of the Related Art

U.S. Pat. Nos. 5,754,856 and 5,802,600 disclose a system for transferring messages among computers and a coupling facility CF shared by computers.

SUMMARY OF THE INVENTION

It is an object of the present invention to provide a method and system capable of selecting a computer or computers connected to a shared coupling facility for backing up shared data, in accordance with the cost of each computer resource and reliability, and transferring the shared data in multiples in accordance with an importance degree of the shared data.

It is another object of the invention to provide a shared data transfer method and system capable of reducing the number of transfers of shared data between computers, suppressing the use amount of expensive resources, and shortening a data transfer time.

It is still another object of the invention to provide a data recovery system capable of recovering data lost in a computer which originally stored the lost data, in response to a request from another computer connected to the computer.

In order to achieve the above objects of the invention, a computer connected to a plurality of computers, is provided which comprises a storage area for storing data representative of properties of the plurality of computers relative to the computer; a data area for storing data to be used by the plurality of computers; and a program for determining a computer which holds data in the data area in accordance with another request for the data area.

In a shared data transfer method to be executed by a coupling facility connected to a plurality of computers, the coupling facility having a shared storage area shared by the plurality of computers, property information of each computer is stored in the coupling facility, a computer which performs a process of saving data stored in the shared storage area is selected from the plurality of computers in accordance with the property information, the data stored in the shared storage area is transferred to the selected computer, and information representative of a correspondence relation between the transferred data and the selected computer is stored.

As the property information of each computer, the connection type of each computer to the coupling facility may be used.

As the property information of each computer, an interface of an external storage device of each computer may be used.

The coupling facility stores information regarding a correspondence relation between the shared data in the shared storage area and an importance degree of the shared data, selects one or more computers which save the shared data, in accordance with the importance degree of the shared data, and saves the shared data in multiples.

Further, the coupling facility uses a computer fault occurrence frequency as one piece of the property information of each computer, compares a reference value with the computer fault occurrence frequency of the selected computer which saves the shared data, and in accordance with the comparison result, executes a process of saving the shared data.

BRIEF DESCRIPTION OF THE DRAWINGS

FIG. 2 is a diagram showing examples of computer property information according to the embodiment of the invention.

FIG. 7 is a diagram showing examples of shared data information according to the embodiment of the invention.

DESCRIPTION OF THE PREFERRED EMBODIMENTS

Embodiments of the invention will be described with reference to the accompanying drawings.

Figure 1:
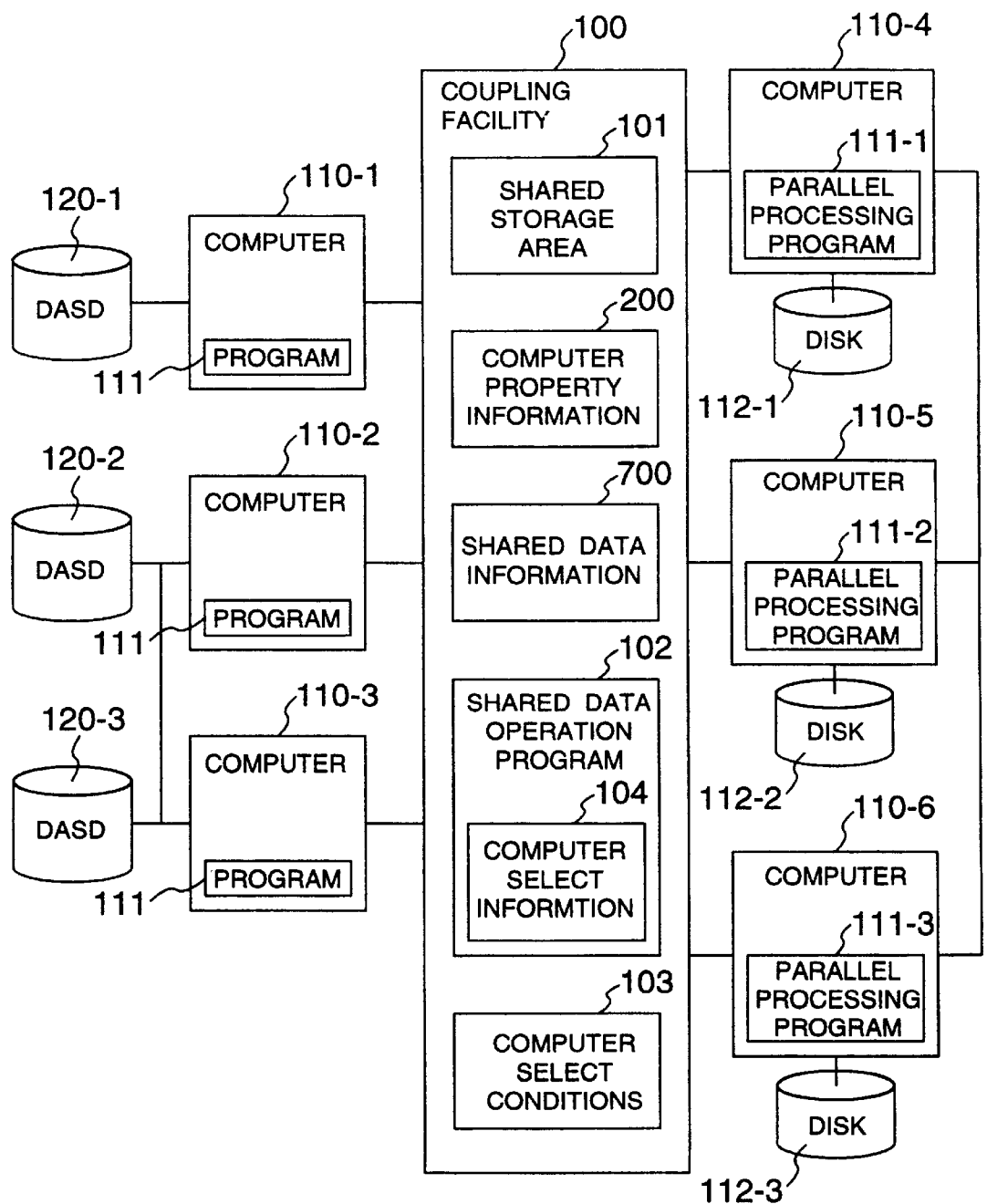
FIG. 1 is a diagram showing a configuration of a computer system according to an embodiment of the invention.

FIG. 1 is a diagram showing the configuration of a computer system according to an embodiment.

In FIG. 1, a coupling facility 100 connected to a plurality of computers constitutes by itself a computer.

The coupling facility 100 is provided with a shared storage area 101, a shared data operation program 102, computer select condition information 103, computer select information 104, computer property information 200 of each computer connected to the coupling facility, and shared data information 700 indicating a relation between shared data transferred to computers and transfer destination computers.

Computers 110-1, 110-2 and 110-3 each have a processing program 111 and are a mainframe. The computers 110-1, 110-2 and 110-3 store data in disk devices 120-1, 120-2 and 120-3. The disk device 120-2 or 120-3 may be shared by the computers 110-2 and 110-3.

The computers 110-1, 110-2 and 110-3 may be connected, for example, via high speed optical channels, to the coupling facility 100. An interface of the disk device is an optical channel.

Computers 110-4, 110-5 and 110-6 each are a parallel computer having a parallel processing program, the computers having corresponding disks 112-1, 112-2 and 112-3.

The computers 110-4, 110-5 and 110-6 may be connected via metal channels to the coupling facility.

Interfaces of the disks 112-1, 112-2 and 112-3 may be small computer system interfaces (SCSI).

A metal channel is generally not so expensive as a high speed optical channel. A SCSI interface is expected not so expensive as an optical channel.

These computers 110-4, 110-5 and 110-6 are provided with the parallel processing programs 111-1, 111-2 and 111-3 for data retrieval, data mining and the like.

The computers 110-4, 110-5 and 110-6, which acknowledged a decision support process or the like in response to an event such as a file read, run the programs 111-1 to 111-3 such as data mining to parallelly process data possessed by each computer.

Each field of the computer property information 200 will be described with reference to FIG. 2.

The computer property information 200 is used when a computer is selected which executes a process of backing up data in the shared storage area 101.

The computer property information 200 is constituted of a field 201 for storing a channel number of each computer 110 connected to the coupling facility 100; a field 202 for storing a type of a channel for connection to the coupling facility 100; a field 203 for storing a type of an interface of an external storage unit of each computer 110; and a field 204 for storing a value indicating a fault occurrence frequency of each computer 110.

The field 202 stores the type of a channel, for example, a LAN, a high speed optical channel or a metal channel. The field 203 stores the type of a disk connection interface, for example, an optical channel or a SCSI channel. The field 204 stores the value indicating a property of each computer 110, for example, a fault occurrence frequency.

When the coupling facility 100 is set up, a program checks the type and status of the channel of each computer 110. The coupling facility 100 can set each value to each field.

Data representative of which field among the fields 202, 203, and 204 or what combination thereof is selected is also set to the computer select condition information 103, as the conditions of selecting the computer or computers 110 which execute the backup process.

In the above manner, a correspondence between each computer 110 using the shared storage area 101 and the property of each computer 110 is stored in the computer property information 200.

Each field of the common data information 700 will be described with reference to FIG. 7.

The shared data information 700 is used for determining the number of computers to which data is saved, in accordance with the importance degree of data in the shared storage area 101. Obviously it is desired that the higher the importance degree, data is saved in more computers.

The shared data information 700 has the following fields a field 701 for storing identification information for identifying a data block in the shared storage area 101;

a field 702 for storing a value (integer of 1 or larger) indicating whether data in the data block may be lost or whether the data is backed up in multiples even if the disk space is consumed;

a field 703 for storing the number of multiples of data in the data block backed up in computers 110;

a field 704 for storing the number of divisions of the data block to be distributed to a plurality of computers 110;

a field 705 for storing the channel number of the computer the data block was transferred; and a field 706 for storing information indicating whether the data is in the shared storage area 101.

When data is stored in the shared storage area 101, each computer 110 designates a value in accordance with a criterion common to all computers and this value is set to the field 702.

The shared data operation program 102 sets predetermined data to the field 703, 704 and 705.

In the example of data 1 shown in FIG. 1, the importance degree (702) designated by a computer 110 is "2", and the multiple number (703) set when the system actually runs is "2" which may take any of other larger values. The division number (704) is null, which may be indicated by a blank cell as shown in FIG. 7. The transfer destination computer field (705) has two values "5" and "6" which correspond to the computers 110-5 and 110-6, because of the importance degree of "2" and the multiple number of "2". The data presence (706) is "1" which indicates that data 1 is present in the shared storage area 101.

In the example of data 2 shown in FIG. 7, the importance degree (702) designated by a computer 110 is "1". The multiple number (703), division number (704) and transfer destination computer (705) in this example indicate the following. The upper side multiple number of "1" and transfer destination computer of "4" indicate that the data 2 is backed up in the computer 110-4 with the multiple number "1". The lower side division number of "2" and transfer destination computers "5" and "6" indicate that the data 2 is divided into halves and transferred to the computers 110-5 and 110-6 in response to the requests from the computers 110-5 and 110-6. The data presence (706) is "1" which indicates that data 2 is present in the shared storage area 101.

Figure 3:
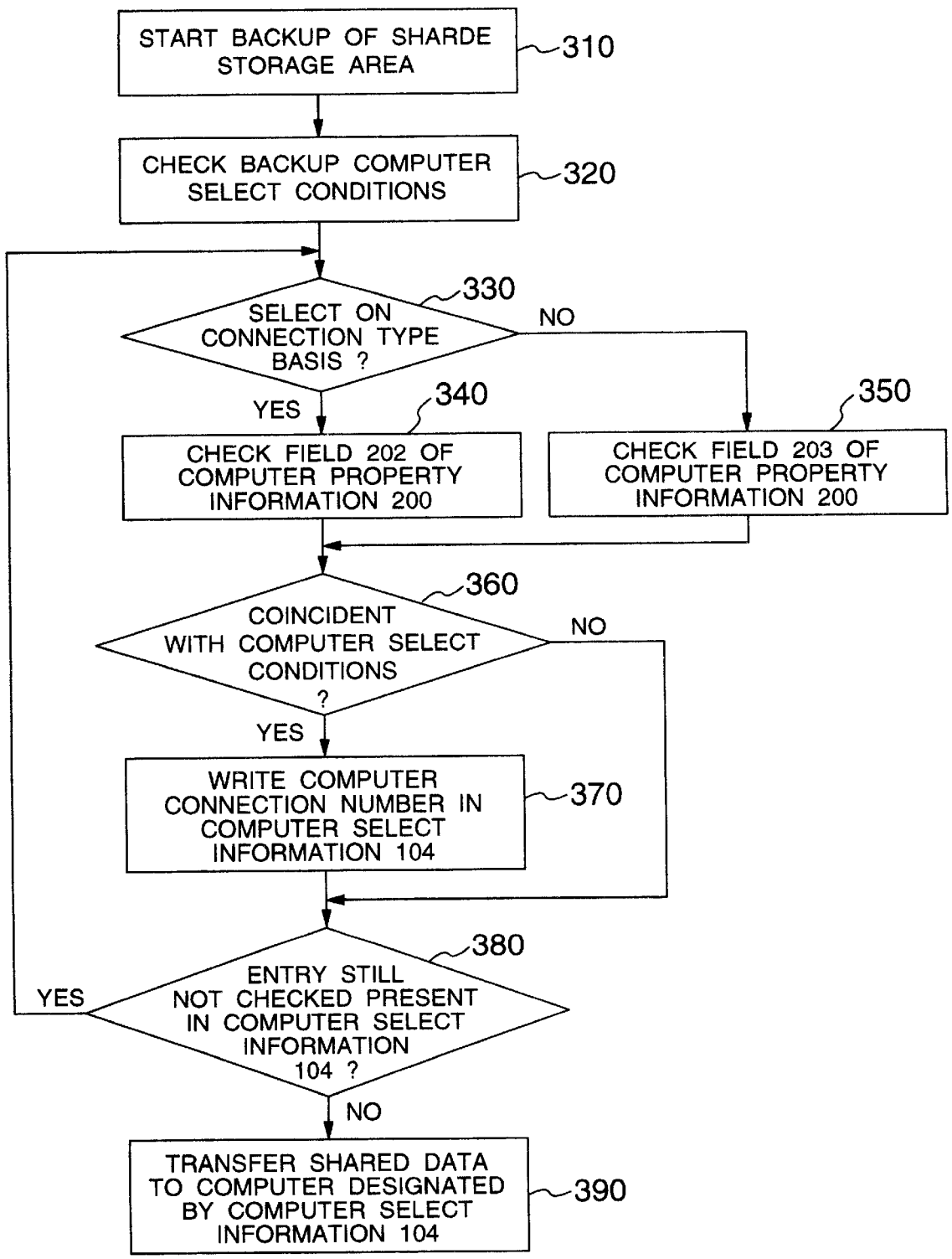
FIG. 3 is a flow chart illustrating a process of backing up a shared storage area according to the embodiment of the invention.

With reference to the flow charts shown in FIGS. 3 and 6, a data transfer process for backup of the shared storage area will be described.

When it becomes necessary for the shared data operation program 102 to start backup of the shared storage area at a timing of starting cast-out or the like (Step 310), the program 102 reads the computer select condition information 103 in order to make the coupling facility to check the conditions of selecting a computer or computers 110 which execute backup (Step 320). The computer select condition information 103 describes the select conditions whether the connection type of a backup computer such as a high speed optical channel and a metal channel is selected or one of the interface type of an external storage device is selected.

It is checked whether the computer select information 103 read at Step 320 is the computer connection type (Step 330). If computer connection type, the field 202 of the computer property information 200 is checked (Step 340), whereas if not computer connection type, the field 203 of the computer property information 200 is checked (Step 350).

If the field checked at Step 340 or 350 has a computer connection number entry (FIG. 2) coincident with the computer select condition information 103 (Step 360), the computer connection number corresponding to the field 201 of the entry is written in the computer select information 104 (Step 370).

It is judged whether each computer 110 coincident with the computer select condition information 103 is selected completely from all entries (all computer connection numbers, FIG. 2) in the computer property information 200 (Step 380), and if there is an entry still not checked, the operations are repeated from Step 330.

If it is judged at Step 380 that each computer 110 coincident with the computer select condition information 103 is selected completely from all entries in the computer property information 200, transfer of data in the shared storage area 101 to the selected computer or computers starts (Step 390).

Figure 6:
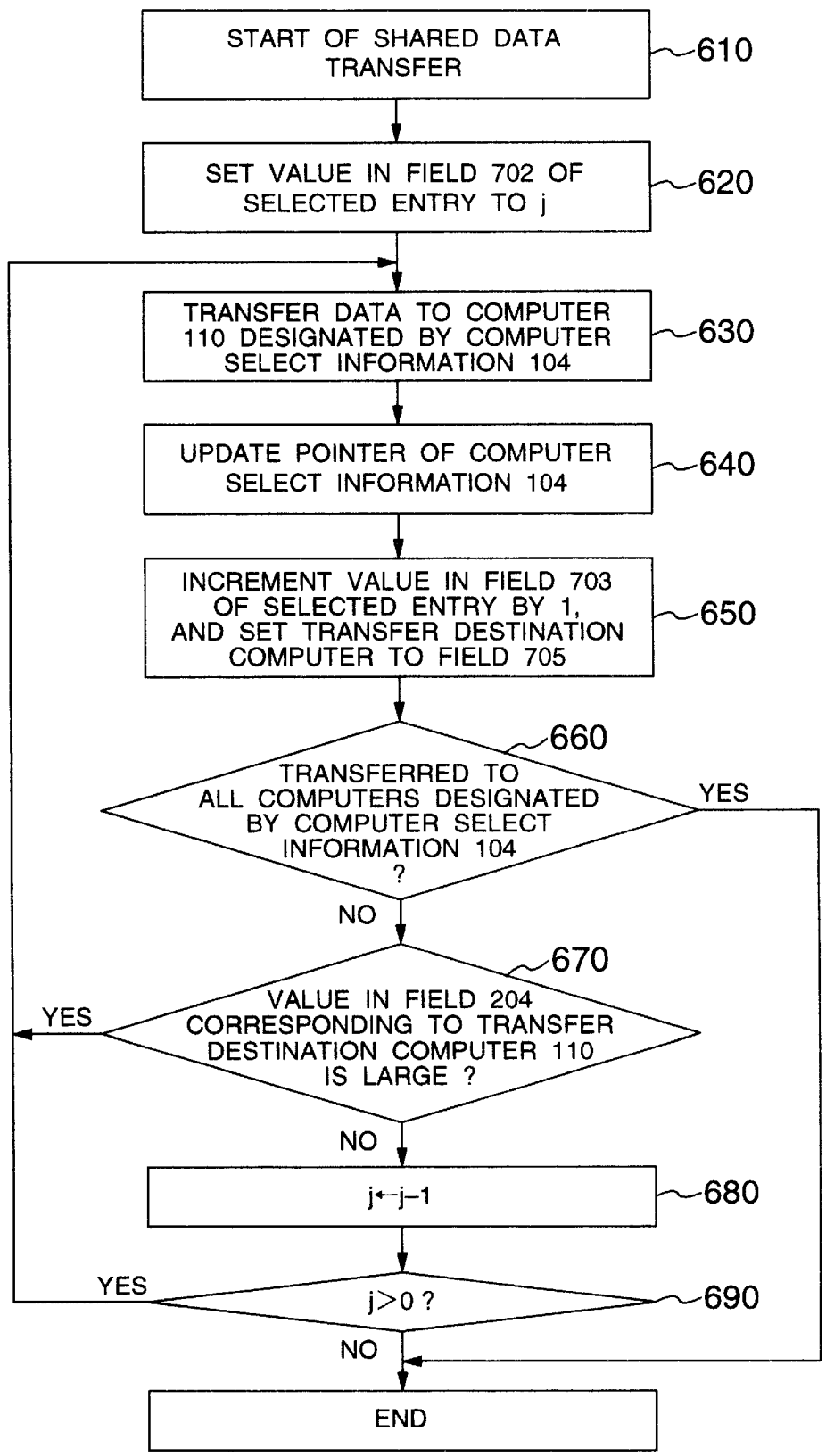
FIG. 6 is a flow chart illustrating a process of transferring data in the shared storage area to a computer.

With reference to FIG. 6, the process at Step 390 will be described, which transfers data in the shared storage area 101 to a computer or computers 110 for backup of the data.

At the start of transfer of data registered in the shared data information 700 (Step 610), a value indicating the importance degree field 702 of the entry corresponding to backup data is substituted in an index j (Step 620).

Next, one computer 110 is selected in accordance with the computer select information 104 and the backup data is transferred thereto (Step 630), and a pointer indicating one computer 110 described in the computer select information 104 is moved (Step 640).

If data was transferred at Step 640 to the last computer written in the computer select information 104, the pointer is moved to indicate the computer described at the top of the computer select information 104.

Next, a value indicating the number of computers which back up data and corresponding to the multiple number in the field 703 of the entry is incremented by "1" and the connection number of the transfer destination computer is written in the transfer destination computer field 705.

It is judged whether backup data is transferred to all the computers written in the computer select information 104 (Step 660). If transferred, the flow is terminated.

If it is judged at Step 660 that there is a computer to which data is still not transferred, the value in the field 204 indicating the fault occurrence frequency of the computer to which data was transferred at Step 640, is compared with a reference value (Step 670). If the value in the field 204 is larger, the above operations are repeated from Step 630 to back up data also in another computer 110.

The reference value is, for example, a value of the number of backup computers in the field 703 added with a predetermined value.

If it is judged at Step 670 that the value in the field 204 is smaller, "1" is subtracted from the value of the index j (Step 680), and the new value j is compared with 0 (Step 690).

If j is 0 or smaller, the flow is terminated, whereas if not, the above operations are repeated from Step 630 in order to back up data in another computer 110.

When data is transferred to a computer 110 at Step 630, an external interrupt is issued to the computer 110 or a function of notifying from the coupling facility 100 to the computer 110 via the high speed optical channel is used.

As above, in accordance with the connection type 202 or external storage device interface 203 of the computer property information 200, the shared data operation program 102 selects each computer 110 to which data in the shared storage area 101 is backed up, and transfers the data thereto.

A correspondence between the data identification information 701 in the shared storage area 101 and the transfer destination computer 110 may be loaded in the field 705.

If the fault occurrence frequency of the backup computer 110 or disk 112 is high, data is transferred to a plurality of computers 110 in order to prevent the data from being destroyed. Important data in particular is transferred to a plurality of computers 110 in order to prevent the data from being destroyed.

Figure 4:
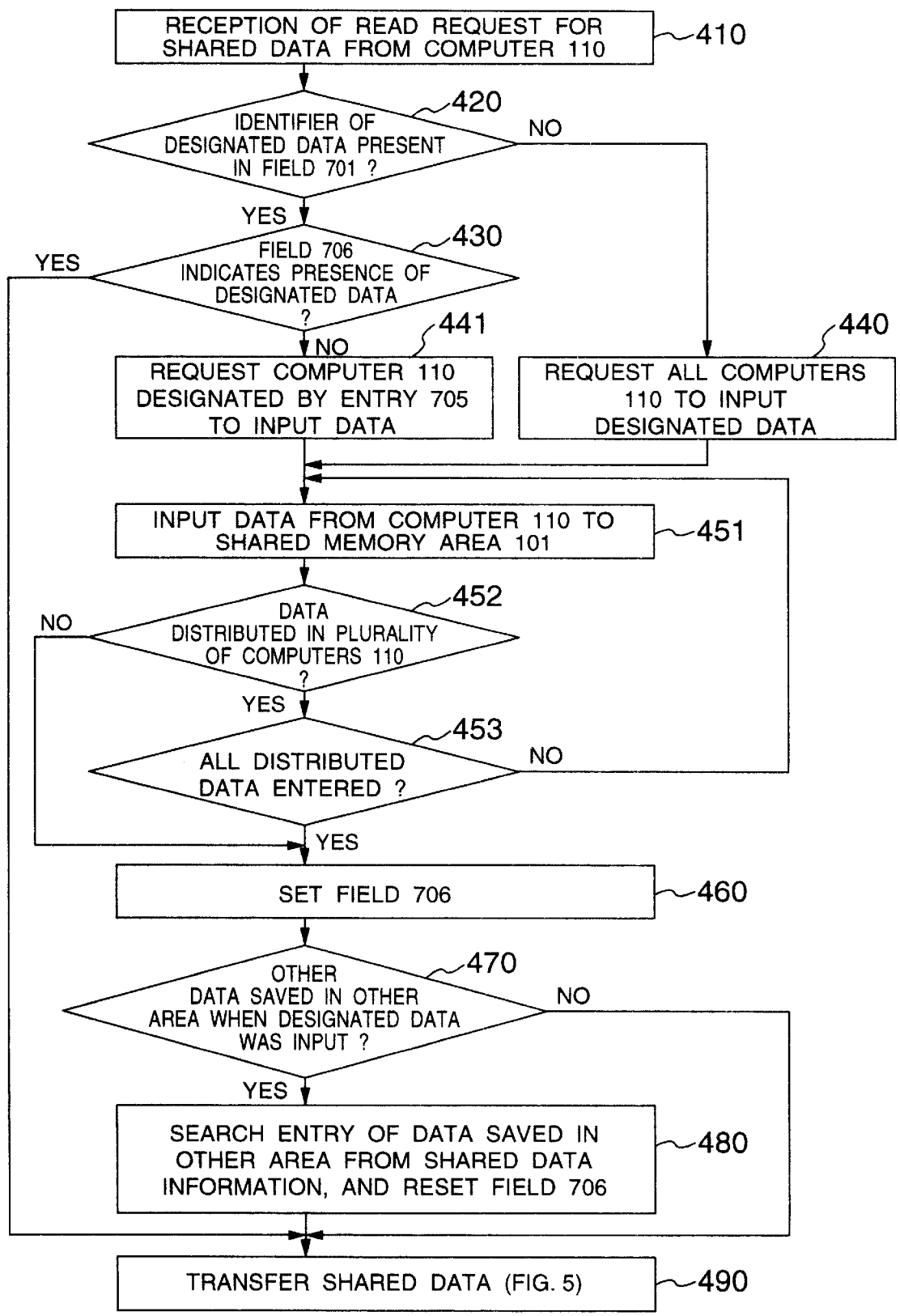
FIG. 4 is a flow chart illustrating a process of reading and writing backup data into the shared storage area according to the embodiment of the invention.
Figure 5:
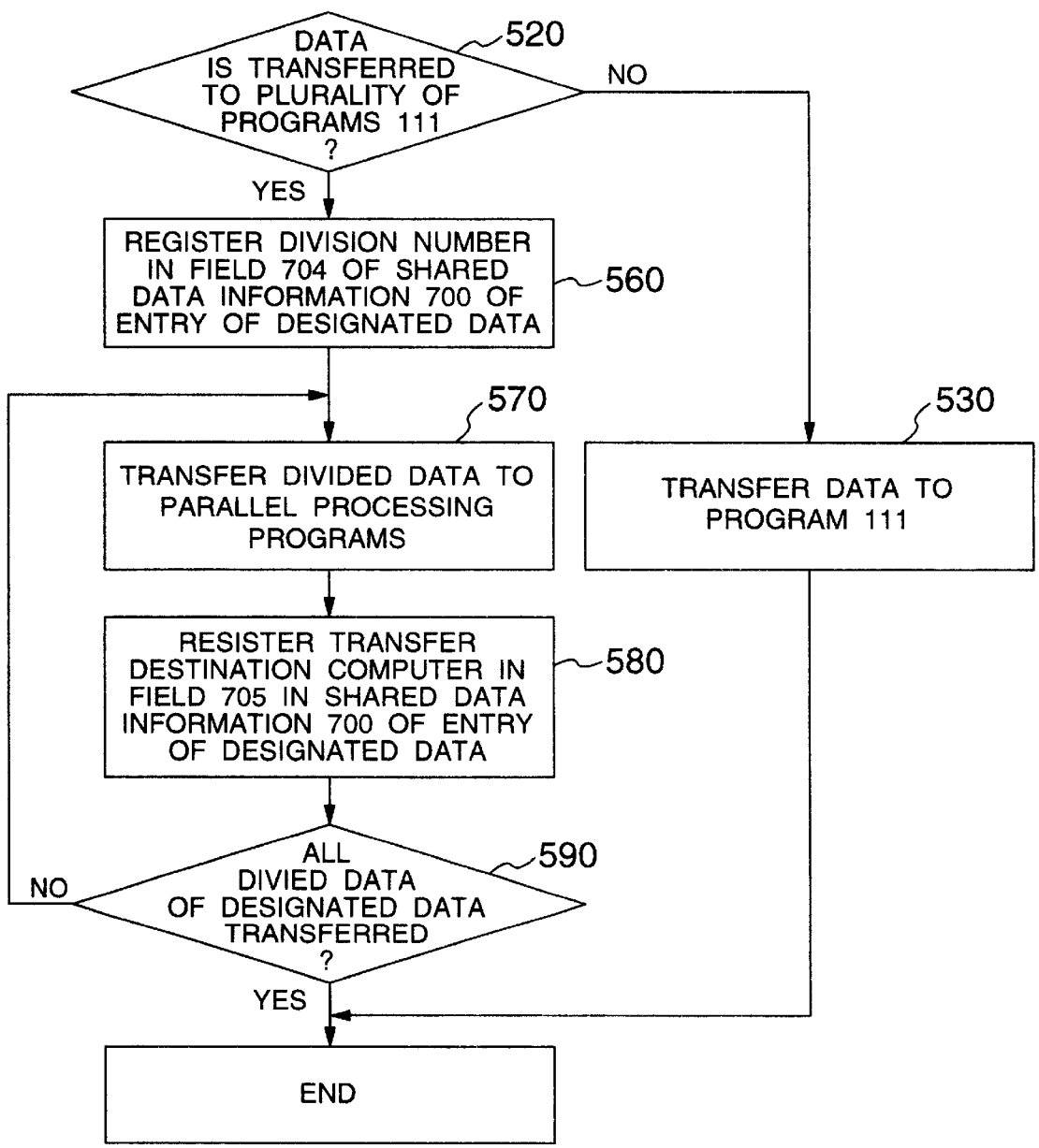
FIG. 5 is a flow chart illustrating a process of dividing data in the shared storage area and passing it to a program according to the embodiment of the invention.

With reference to the flow charts shown in FIGS. 4 and 5, a process to be executed by the shared data recovery operation program 102 will be described which process reads data backed up in a computer or computers 110, writes it into the shared storage area 101, and transfers it to a plurality of programs 111.

A read request for data in the shared storage area 101 issued from some computer 110 is received by the common data operation program 102 (Step 410). It is checked from the value in the field 701 whether there is the entry of the designated data in the shared data information 700 (Step 420).

If it is judged at Step 420 that the identifier of the designated data is not present in the field 701, all the computers 110 are requested to write the designated data in the shared storage area 101 (Step 440). This request is responded by the computer or computers 110 having the designated data.

In contrast, if it is judged at Step 420 that the identifier of the designated data is present in the field 701, then it is checked from the field 705 of the entry whether the designated data is present in the shared storage area 101 (Step 430).

If it is judged that there is the designated data, the designated data is transferred to the requesting computer 110 (Step 490) to thereafter terminate the process.

If it is judged at Step 430 that there is no designated data, the computer 110 connected to the channel number written in the field 705 of the entry is requested to write the designated data in the shared storage area 101 (Step 441). In response to this request, the computer 110 transfers the data to the shared storage area 101 (Step 451).

Next, it is checked from the field 704 of the entry whether the data was distributively backed up in a plurality of computers 110 (Step 452).

If it is judged at Step 452 that the data is distributed into a plurality of computers 110, it is then judged whether all the distributed data has been entered (Step 453). If not, the operations are repeated from Step 451.

If the distributed data has been entered, data presence information indicating that the data is present in the shared storage area 101 is written in the field 706 of the entry (Step 460).

If it is judged at Step 420 that there is no entry of the designated data, an entry is added to the shared data information 700 at Step 460 to write the identifier of the designated data, data importance degree, and data presence information in the fields 701, 702 and 706, respectively.

It is assumed that the data importance degree is passed to the shared data operation program 102 when the computer 110 writes the data into the shared storage area 101.

It is judged whether the data was overwritten in the shared storage area 101 at Step 451 by saving other data in another area because of an insufficient space (Step 470). If it is judged that the data was overwritten, an entry of the data saved in the other area is searched from the shared data information 700 and the data presence information in the field 706 is reset (Step 480).

Lastly, the designated data written in the shared storage area is transferred to the computer 110 requested at Step 410 (Step 490) to thereafter terminate the process.

With reference to the flow chart shown in FIG. 5, a process at Step 490 will be described which passes the data in the shared storage area 101 to the parallel processing programs 111-1 to 111-3.

First, it is checked whether there are a plurality of parallel processing programs 111-1 to 111-3 for processing data in the shared storage area 101 (Step 520).

It is assumed that information of the parallel processing programs 111-1 to 111-3 to which data is transferred is included in a request item of the data read request.

If it is judged at Step 520 that there is only one parallel processing program 111 to which data is transferred, then the requested data is transferred to this parallel processing program 111 (Step 530) to terminate the process.

In contrast, if it is judged that there are a plurality of parallel processing programs 111-1 to 111-3 to which data is transferred, the number of parallel processing programs 111 to which data is transferred is written in the field 704 of the shared data information 700 of the entry corresponding to the requested data (Step 560).

Next, data having a size corresponding to each of the designated data divided by the number of programs is transferred to the parallel processing programs 111 determined at Step 520 (Step 570), and the channel connection number of the computer having the parallel processing program 111 to which the data was transferred is written in the field 705 of the entry (Sep 580).

Next, it is checked whether all the divided data of the designated data is transferred to all the parallel processing programs 111 (Step 590). If transferred, the process is terminated.

In contrast, if it is judged at Step 590 that the divided data to be transferred is still left, the operations are repeated from Step 570.

In this manner, the shared data backed up in a plurality of computers 110 is restored in the shared storage area 101, and other computers 110 can read it.

Further, since the data in the shared storage area 101 is divided by the number of programs 111 which execute parallel processing and then the divided data is transferred, the parallel processing program 111 received the data can process it without distributing it to a plurality of parallel processing programs 111.

Figure 8:
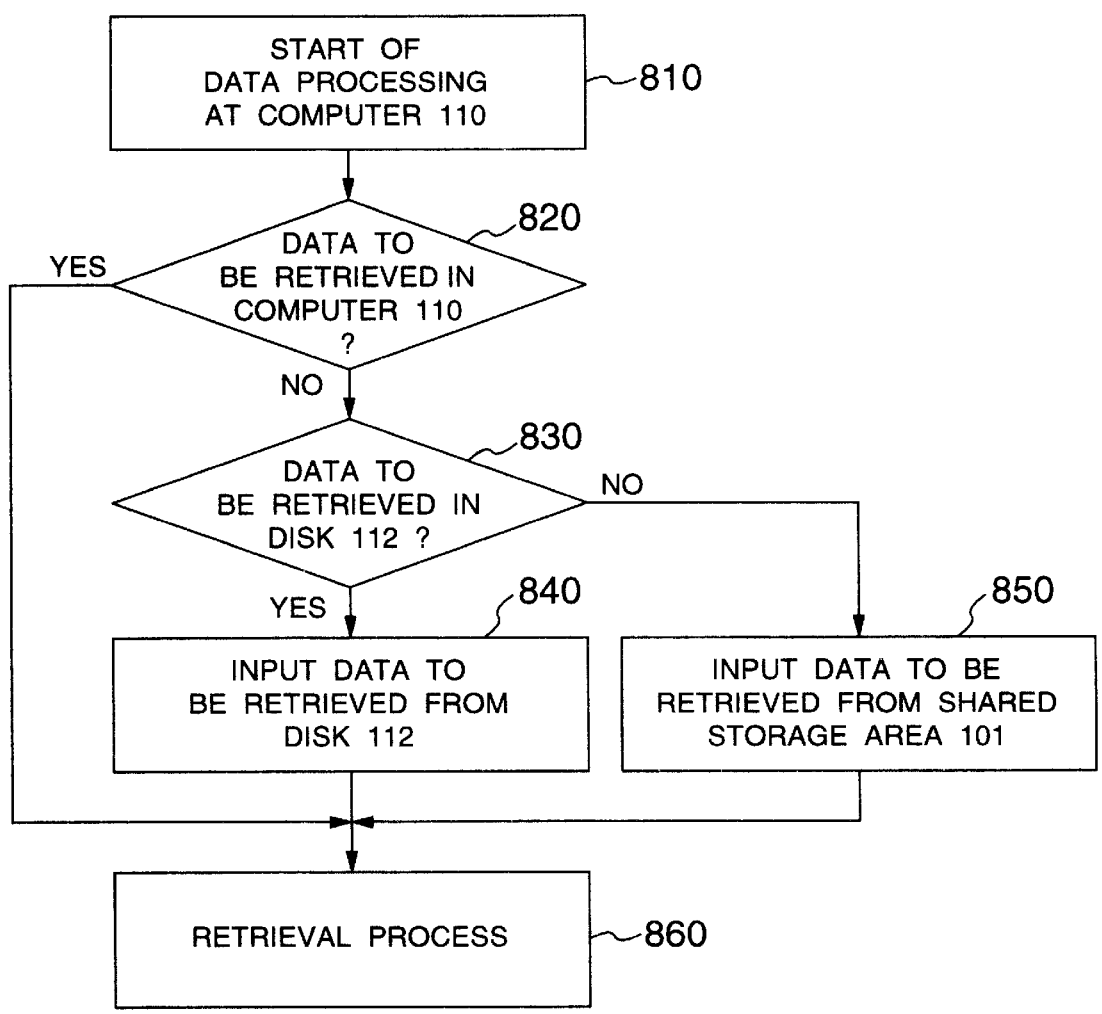
FIG. 8 is a flow chart illustrating data processing using backup data in the shared storage area according to the embodiment of the invention.

With reference to the flow chart shown in FIG. 8, a data process to be executed by a computer 110 by using backup data in the shared storage area 101 will be described.

At the start of data processing by a computer 100 (Step 810), it is checked whether the data to be processed (to be retrieved) is present in the computer 110 (Step 820).

If the designated data is present in the computer 110, the data processing can be performed immediately (Step 860).

If the designated data is not present in the computer 110, it is checked whether the designated data is in the disk 112 of the computer 110 (Step 830).

If it is judged that the data is not present also in the disk 112, it is requested that the data is read from the shared storage area 101, and in response to this request, the shared data operation program 102 transfers the designated data (FIGS. 4 and 5) to the computer (Step 850) which can therefore start the data processing (Step 860).

If it is judged at Step 830 that the designated data is present in the disk 112, then the designated data is read from the disk (Step 840) and the computer can start the data processing (Step 860).

In the above manner, the computers 110-4, 1105 and 110-6 constituting a parallel computer system can perform the data retrieval process of the data processed by the computers 110-1, 110-2 and 110-3 without requesting the data from the coupling facility 100, by using the backup data in the computer 110 or disk 112.

Obviously, the programs realizing the abovedescribed functions in the coupling facility or in computers can be set in the shared data operation program 102 or computer program 111, via a communication line or storage medium.

Figure 9:
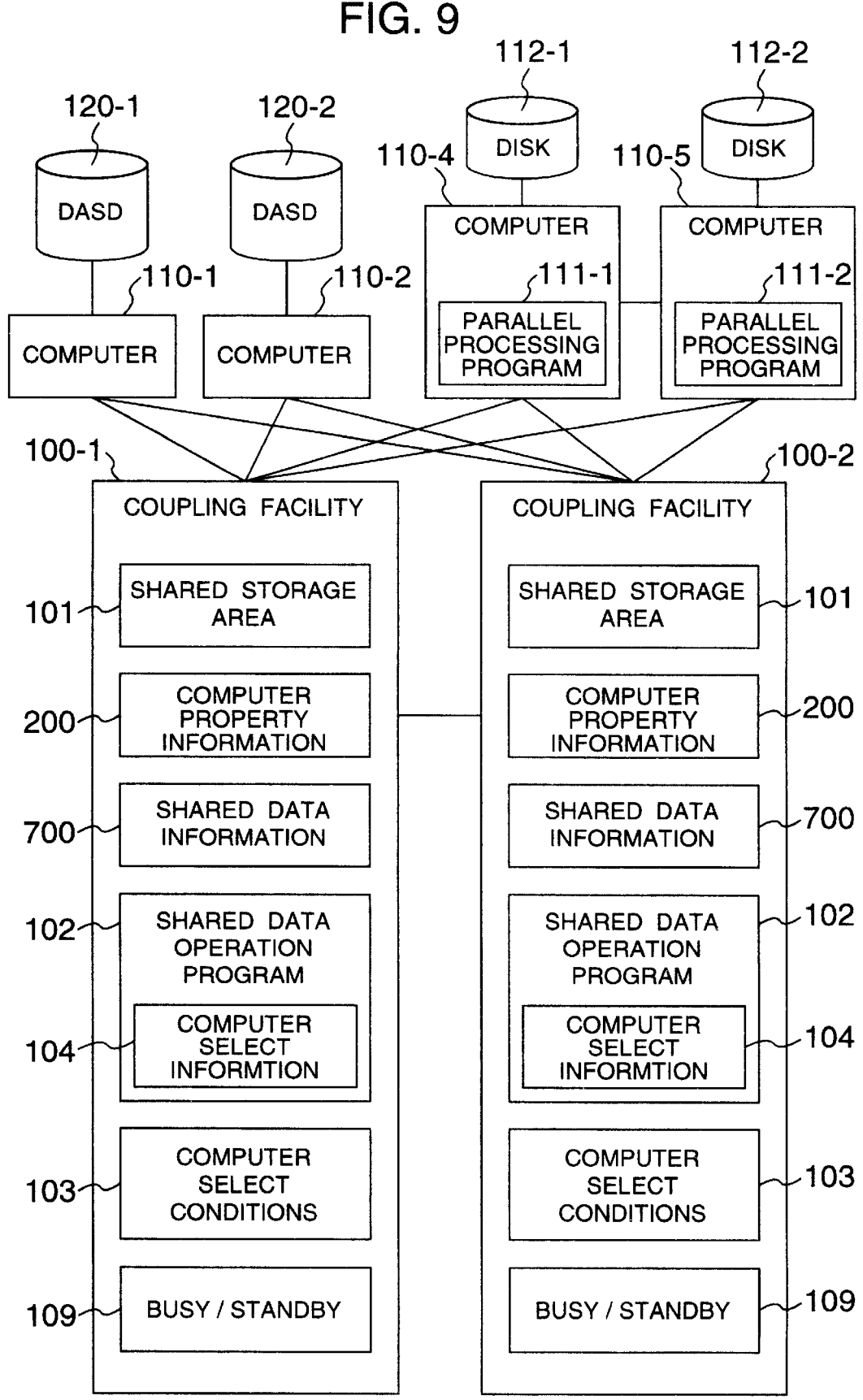
FIG. 9 is a diagram showing a configuration of a computer system with a plurality of coupling facilities according to another embodiment of the invention.

FIG. 9 shows another embodiment of a computer system. In the system shown in FIG. 9, two coupling facilities 100-1 and 100-2 are each connected to a plurality of computers 110 and are connected together. A "busy" state is set in a busy/standby area 109 of one of a plurality of coupling facilities, and a "standby" state is set to the areas 109 of the other coupling facilities.

Information on the connection between the coupling facilities 100 is added to the entry of the computer connection number in the computer property information 200 shown in FIG. 2. The two computer select conditions 103 are set with the information that each coupling facility 100 selects the other coupling facility. The shared data operation program 102 of the "busy" coupling facility copies data in the shared storage area 101 to the shared storage area 101 of the other coupling facility 101.

With this configuration, even if a fault occurs at the "busy" coupling facility 100-1, the other coupling facility 100-2 can be used to continue the process by the computer system without interruption. Accordingly, the reliability of the system can be improved further.

Figure 10:
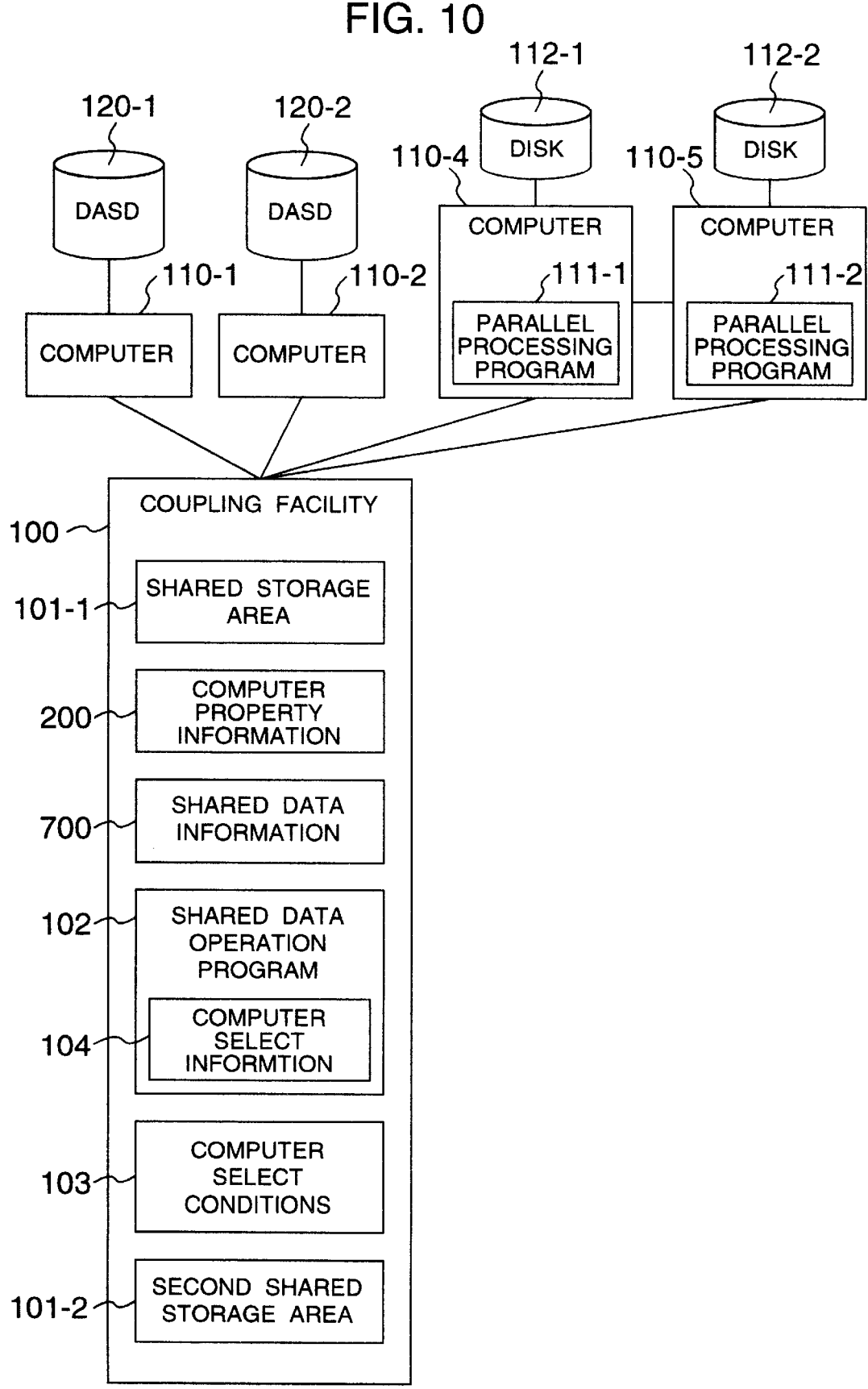
FIG. 10 is a diagram showing a configuration of a computer system with a plurality of shared storage areas according to still another embodiment of the invention.

FIG. 10 shows another embodiment of a computer system, wherein a coupling facility 100 has a plurality of shared storage areas 101-1 and 101-2.

Information that the connection type among a coupling facility 100 is ultra high speed is added to the computer property information 200 shown in FIG. 2. Information that the second shared storage area 101-2 is selected is set to the computer select conditions 103. The shared data operation program 102 copies data in the shared storage area 101-1 to the second shared storage area 101-2.

With this configuration, even if a fault occurs at one shared storage area 101-1, the other shared storage area 101-2 can be used to continue the process by the computer system without interruption. Different memory cards are used as the storage areas 101-1 and 101-2 so that the reliability of the system can be improved further.

According to the above embodiments, in using transaction data generated at a mainframe in the course of developing business administration strategy, as decision support data, a parallel computer backs up the transaction data in the shared storage area. Therefore, the backup process by the mainframe and its resources are not necessary and frequent data transfer between the mainframe and parallel computer is not necessary.

The computer property information 200, shared data information 700, data processing program 102, and computer select conditions 103 may be stored not in the coupling facility 100 but in the computer 110.

What is claimed is:

1. A computer connected to a plurality of computers, comprising:
   a data area for storing shared data available by the plurality of computers;
   a data area for storing data representative of respective properties of the plurality of computers and data representative of level of importance of each of the shared data; and processing means for determining number of computers to hold the shared data and which computer holds the shared data in accordance with the respective properties and the level of importance.

2. A computer according to claim 1, wherein the data is transferred to the computer which holds the data.

3. A computer according to claim 2, further comprising a computer correspondence relation storage area for storing an identifier of a computer to which the data is transferred.

4. A computer according to claim 3, wherein the data is transferred to the computer which holds the data.

5. A computer according to claim 4, wherein the data is recovered from the computer which holds the data and writing the data into the data area, in response to an access to the data in the data area and by referring to the computer correspondence relation storage area.

6. A computer according to claim 5, wherein the data recovered and written into the data area is sent to a computer which issued an access to the data in the data area.

7. A computer according to claim 6, wherein each of the properties of the plurality of computers is represented by a value determined by at least one of a computer fault occurrence frequency, a data transfer speed relative to the computer, an importance degree of data shared by processing programs of the plurality of computers.

8. A computer according to claim 7, a plurality of computers which hold the data in the data area in multiples being determined in accordance with the value in the storage area.

9. A computer according to claim 7, a plurality of computers which hold the data in the data area in divisions being determined in accordance with the value in the storage area.

10. A data transfer control method of controlling data transfer by operating a computer connected to a plurality of computers, the method comprising:

storing shared data available by the plurality of computers in a data area;

storing in a data area data representative of properties of the plurality of computers and data representative of level of importance of each of the shared data; and determining number of computers to hold the shared data and which computer holds the shared data in accordance with the respective properties and the level of importance.

11. A data transfer control method according to claim 10, further comprising:

a step of storing an identifier of a computer which holds the data, in a computer correspondence relation storage area, when the data is transferred to the computer which holds the data; and a step of recovering the data from the computer which holds the data and writing the data into the data area, in response to an access to the data in the data area and by referring to the computer correspondence relation storage area.

12. A data transfer control method according to claim 11, further comprising a step of determining a plurality of computers which hold the data in the data area in multiples, in accordance with a value in the storage area.

13. A data transfer control method according to claim 11, further comprising a step of determining a plurality of computers which hold the data in the data area in divisions, in accordance with a value in the storage area.

14. A storage medium storing a program file having a program code to be read by a computer, the storage medium being loaded in the computer and comprising:

a program section representative of storing shared data available by the plurality of computers;

a program section representative of storing in a data area data representative respective properties of the plurality of computers and data representative of level of importance of each of the shared data; and a program section representative of determining number of computers to hold the shared data and which computer holds the shared data in accordance with the respective properties and the level of importance.

15. A storage medium according to claim 14, further comprising:

a program section representative of a step of storing an identifier of a computer which holds the data, in a computer correspondence relation storage area, when the data is transferred to the computer which holds the data; and a program section representative of a step of recovering the data from the computer which holds the data and writing the data into the data area, in response to an access to the data in the data area and by referring to the computer correspondence relation storage area.

16. A storage medium according to claim 15, further comprising a program section representative of a step of determining a plurality of computers which hold the data in the data area in multiples, in accordance with a value in the storage area.

17. A storage medium according to claim 15, further comprising a program section representative of a step of determining a plurality of computers which hold the data in the data area in divisions, in accordance with a value in the storage area.

18. A program file for operating a computer, the program file being transmitted to the computer and comprising:

storing shared data available by a plurality of computers;

storing in a data area data representative of respective properties of the plurality of computers and data representative of level of importance of each of the shared data; and determining number of computers to hold the shared data and which computer holds the shared data in accordance with the respective properties and the level of importance.

19. A program file according to claim 18, further comprising:

a step of storing an identifier of a computer which holds the data, and a data ID, in a computer correspondence relation storage area, when the data is transferred to the computer which holds the data; and a step of recovering the data from the computer which holds the data and writing the data into the data area, in response to an access to the data in the data area and by referring to the computer correspondence relation storage area.

20. A program file according to claim 19, further comprising a step of determining a plurality of computers which hold the data in the data area in multiples, in accordance with a value in the storage area.

21. A data format for a shared computer connected to a plurality of computers, the data format including items of a data importance degree, a transfer destination computer ID, and a data presence indicating whether data is present only in a transfer destination computer or is present both in the transfer destination computer and the shared computer, the items being pared with a data ID.

22. A data format according to claim 21, wherein the data format including a division number of computers which hold the data in the data area in divisions in accordance with a value in the storage area.

23. A shared data transfer method to be executed by a coupling facility connected to a plurality of computers, the coupling facility having a shared storage area for shared data shared by the plurality of computers, and the method comprising:

holding property information of each computer in the coupling facility;

selecting from the plurality of computers a computer which performs a process of saving data stored in the shared storage area, in accordance with level of importance of each of the shared data in the property information;

transferring the data stored in the shared storage area to the selected computer; and holding information representative of a correspondence relation between the transferred data and the selected computer.

24. A computer connected to a plurality of computers, comprising:

a data area for storing shared data available by the plurality of computers;

a data area for storing data representative of respective properties of the plurality of computers and data representative of level of importance of each of the shared data; and processing means for determining number of computers to hold the shared data and which computer holds the shared data in accordance with the respective properties and the level of importance, wherein a data format of the data in the data area includes items of a data importance degree, a transfer destination computer ID, and a data presence indicating whether data is present only in a transfer destination computer or is present both in the transfer destination computer and a shared computer, the items being pared with a data ID.

25. A computer according to claim 24, wherein the data format of the data in the data area includes a division number of computers which holds the data in the data area in divisions in accordance with a value in the storage area.

* * * * *